US008622825B2

(12) United States Patent
Griswold et al.

(10) Patent No.: US 8,622,825 B2

(45) Date of Patent: Jan. 7, 2014

(54) MECHANICALLY ROTATING WHEEL WITH CHANGEABLE IMAGE

(75) Inventors: Chauncey W. Griswold, Reno, NV (US); Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 457 days.

(21) Appl. No.: 12/820,286

(22) Filed: Jun. 22, 2010

(65) Prior Publication Data

US 2011/0312401 A1 Dec. 22, 2011

(51) Int. Cl.
*A63F 9/24* (2006.01)
*A63F 13/00* (2006.01)

(52) U.S. Cl.
USPC .................. 463/31; 463/16; 463/20; 463/22; 463/30

(58) Field of Classification Search
USPC ............................................. 463/20, 30, 34
See application file for complete search history.

(56) References Cited

U.S. PATENT DOCUMENTS

| | | | | |
|---|---|---|---|---|
| 4,275,464 | A * | 6/1981 | Schmidt | 714/46 |
| 4,477,901 | A * | 10/1984 | Braband et al. | 714/46 |
| 4,534,557 | A * | 8/1985 | Bigelow et al. | 473/442 |
| 4,727,544 | A * | 2/1988 | Brunner et al. | 463/29 |
| 5,209,483 | A * | 5/1993 | Gedney et al. | 473/223 |
| 5,283,733 | A * | 2/1994 | Colley | 340/323 R |
| 5,284,344 | A * | 2/1994 | Howard | 273/143 R |
| 5,380,008 | A * | 1/1995 | Mathis et al. | 463/18 |
| 6,027,115 | A | 2/2000 | Griswold et al. | |
| 6,073,086 | A * | 6/2000 | Marinelli | 702/141 |
| 6,148,271 | A * | 11/2000 | Marinelli | 702/141 |
| 6,565,449 | B2 * | 5/2003 | Buhler | 473/151 |
| 6,582,330 | B1 * | 6/2003 | Rehkemper et al. | 473/570 |
| 6,677,917 | B2 * | 1/2004 | Van Heerden et al. | 343/897 |
| 6,926,605 | B2 * | 8/2005 | Nguyen et al. | 463/20 |
| 6,950,153 | B2 * | 9/2005 | Lane | 348/744 |
| 7,005,970 | B2 * | 2/2006 | Hodsdon et al. | 340/323 R |
| 7,006,117 | B1 * | 2/2006 | Man et al. | 345/501 |
| 7,091,863 | B2 * | 8/2006 | Ravet | 340/572.1 |
| 7,160,187 | B2 * | 1/2007 | Loose et al. | 463/20 |
| 7,226,358 | B2 | 6/2007 | Miller et al. | |
| 7,452,276 | B2 | 11/2008 | Loose et al. | |
| 7,571,352 | B2 * | 8/2009 | Weichselbaum | 714/27 |
| 7,682,245 | B2 | 3/2010 | Nguyen | |
| 7,744,460 | B2 * | 6/2010 | Walker et al. | 463/21 |
| 7,771,320 | B2 * | 8/2010 | Riley et al. | 482/9 |
| 7,891,666 | B2 * | 2/2011 | Kuenzler et al. | 273/317 |
| 7,893,842 | B2 * | 2/2011 | Deutsch | 340/573.1 |
| 7,896,734 | B2 | 3/2011 | Kaminkow et al. | |

(Continued)

FOREIGN PATENT DOCUMENTS

WO 2009062161 A1 5/2009

OTHER PUBLICATIONS

PCT International Search Report and Written Opinion dated Oct. 28, 2011 for related matter PCT/US2011/040634.

*Primary Examiner* — Steven J Hylinski
(74) *Attorney, Agent, or Firm* — Foley & Lardner LLP

(57) ABSTRACT

A gaming machine includes a gaming machine controller configured to control game play on the gaming machine, and a wheel assembly rotatably coupled to the gaming machine controller. The wheel assembly includes a front portion having an inner surface and at least one projector, wherein the at least one projector is configured to rotate with the wheel assembly and to project an image across at least a portion of the inner surface during game play.

39 Claims, 10 Drawing Sheets

(56) References Cited

U.S. PATENT DOCUMENTS

| | | | | |
|---|---|---|---|---|
| 8,096,878 | B2 * | 1/2012 | Durham et al. | 463/31 |
| 8,123,609 | B2 * | 2/2012 | Sekiguchi et al. | 463/20 |
| 8,128,477 | B2 * | 3/2012 | Durham et al. | 463/17 |
| 8,188,868 | B2 * | 5/2012 | Case, Jr. | 340/573.1 |
| 8,210,944 | B2 * | 7/2012 | Mead | 463/31 |
| 8,251,795 | B2 * | 8/2012 | Durham et al. | 463/20 |
| 2003/0108217 | A1 * | 6/2003 | Tilbury et al. | 381/388 |
| 2003/0160732 | A1 * | 8/2003 | Van Heerden et al. | 343/897 |
| 2004/0082414 | A1 * | 4/2004 | Knox | 473/564 |
| 2004/0150162 | A1 * | 8/2004 | Okada | 273/292 |
| 2005/0085316 | A1 * | 4/2005 | Barr | 473/353 |
| 2007/0054723 | A1 | 3/2007 | Mattice et al. | |
| 2007/0059675 | A1 * | 3/2007 | Kuenzler et al. | 434/251 |
| 2007/0060425 | A1 * | 3/2007 | Kuenzler et al. | 473/570 |
| 2007/0077986 | A1 * | 4/2007 | Loose et al. | 463/20 |
| 2007/0149281 | A1 | 6/2007 | Gadda et al. | |
| 2007/0157488 | A1 * | 7/2007 | Guzman | 36/132 |
| 2007/0191083 | A1 * | 8/2007 | Kuenzler et al. | 463/7 |
| 2007/0228651 | A1 * | 10/2007 | Loose et al. | 273/143 R |
| 2008/0004104 | A1 | 1/2008 | Durham et al. | |
| 2008/0067244 | A1 * | 3/2008 | Marks | 235/385 |
| 2008/0108422 | A1 | 5/2008 | Hedrick et al. | |
| 2008/0125288 | A1 * | 5/2008 | Case | 482/1 |
| 2009/0024601 | A1 * | 1/2009 | Zmolek | 707/4 |
| 2009/0075721 | A1 * | 3/2009 | Pacey et al. | 463/20 |
| 2009/0104964 | A1 | 4/2009 | Snow | |
| 2009/0181755 | A1 * | 7/2009 | Gagner et al. | 463/20 |
| 2009/0280888 | A1 * | 11/2009 | Durham et al. | 463/20 |
| 2011/0119022 | A1 * | 5/2011 | Kuenzler et al. | 702/145 |

* cited by examiner

MECHANICALLY ROTATING WHEEL WITH CHANGEABLE IMAGE

BACKGROUND

The embodiments described herein relate generally to wheel-based games and, more particularly, to mechanically rotating wheels that may be used with multiple games.

As casino games gain an ability to dynamically change content, game themes, and game presentation graphics, a corresponding desire exists to dynamically change graphics on rotating mechanical assemblies associated with the casino games. At least some known assemblies include a stationary projector that projects an image across a surface of a rotating, translucent disk. However, such assemblies generally cause visual artifacts to appear on the disk as a result of representing a sloped line using a rectangular grid of pixels. For example, on some known rotating assemblies, a boundary line between adjoining wheel segments is defined using contrasting colors between the segments. Other known rotating wheel assemblies define the boundary line using thin, radial lines. However, such approaches may cause the human eye to detect visual irregularities. Specifically, as such wheel assemblies are rotated, often such boundary lines appear jagged in a visual effect known as a “stair casing” effect. Such a visual affect may diminish the game presentation to a player and may discourage game play.

BRIEF DESCRIPTION

In one aspect, a gaming machine is provided. The gaming machine includes a gaming machine controller configured to control game play on the gaming machine, and a wheel assembly rotatably coupled to the gaming machine controller. The wheel assembly includes a front portion having an inner surface and at least one projector, wherein the at least one projector is configured to rotate with the wheel assembly and to project an image across at least a portion of the inner surface during game play.

In another aspect, a wheel assembly is provided for use with a gaming machine. The wheel assembly includes a stepper motor configured to rotate the wheel assembly, a front portion having an inner surface, and at least one projector configured to project an image across at least a portion of the inner surface and to rotate with the wheel assembly.

In another aspect, a gaming method is provided. The method includes receiving a game selection at a gaming machine, wherein the game selection is associated with at least one image, and transmitting the at least one image to a wheel assembly within the gaming machine, wherein the wheel assembly includes a front portion having an inner surface and at least one projector positioned with respect to the front portion. The method also includes projecting the at least one image, by the at least one projector, across at least a portion of the inner surface, and rotating the wheel assembly, including the at least one projector, during display of the at least one image.

In another aspect, a gaming system is provided, including a plurality of gaming machines, a wheel assembly configured to rotate about an axis of rotation, and a controller coupled to the gaming machine and to the wheel assembly. The wheel assembly includes a front portion having an inner surface, and at least one projector configured to rotate with the wheel assembly and to project an image across at least a portion of the inner surface. The controller is configured to initiate rotation of the wheel assembly about the axis.

In yet another aspect, a gaming method is provided, including accepting a wager made by a player using at least one of a plurality of gaming machines, and enabling play of a game at the plurality of gaming machines, wherein the game is associated with at least one image. The method also includes transmitting the at least one image to a wheel assembly, wherein the wheel assembly includes a front portion having an inner surface and at least one projector. The method also includes projecting the at least one image, by the at least one projector, across at least a portion of the inner surface, and rotating the wheel assembly, including the at least one projector, during display of the at least one image.

BRIEF DESCRIPTION OF THE DRAWINGS

The embodiments described herein may be better understood by referring to the following description in conjunction with the accompanying drawings.

DETAILED DESCRIPTION

Exemplary embodiments of systems, methods, and apparatus are described herein for use in providing a rotating wheel assembly that includes at least one projector that projects a changeable and/or a downloadable image across a surface of the wheel assembly during rotation of the wheel assembly. The embodiments described herein enable a rotating image to be substituted for a purely mechanical device. Such a substitution facilitates providing a changeable wheel that enables a single gaming machine or gaming table to provide multiple wheel-based games. Moreover, such a substitute facilitates using a mechanically rotating wheel that may be used for multiple wheel-based games.

Figure 1:
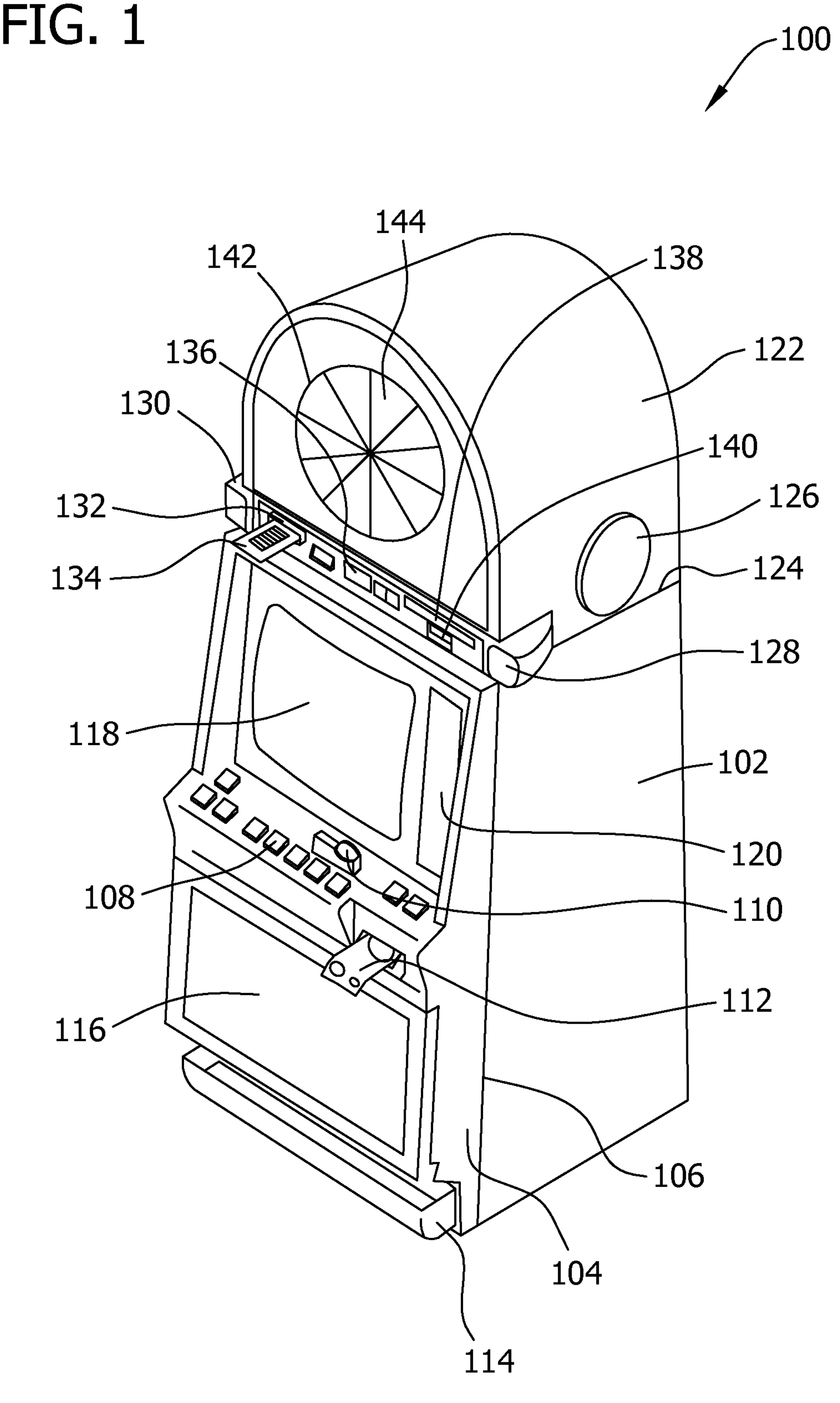
FIG. 1 is a schematic diagram of an exemplary gaming machine that includes a rotatable wheel assembly.

FIG. 1 is a schematic diagram of an exemplary gaming machine 100 that includes a rotatable wheel assembly (not shown in FIG. 1) that displays a plurality of changeable segments. Gaming machine 100 may be any type of gaming machine, and may include different structures or components other than those shown in FIG. 1. Moreover, gaming machine 100 may use different methods of operation than those described below.

In the exemplary embodiment, gaming machine 100 includes a main cabinet 102 that includes a main door 104 that is coupled to a front 106 of gaming machine 100 via a hinge (not shown). When opened, door 104 provides access to an interior (not shown) of gaming machine 100. In the exemplary embodiment, a plurality of player-input switches and/or buttons 108 are coupled to main door 104. Moreover, in the exemplary embodiment, a coin acceptor 110, for accepting coins and/or tokens, a bill acceptor 112, for accepting and/or validating cash bills, a coin tray 114, for collecting a coin-based payout, and a belly glass 116 are each coupled to main door 104. Video display 118 may be implemented as a cathode ray tube (CRT), a flat-panel liquid crystal display (LCD), a plasma display, an organic light-emitting diode (OLED) display, a multi-layer display (MLD), or any other electronically-controlled video monitor. Moreover, video display 118 may include touch screen capabilities. In some embodiments, symbols, images, and/or indicia displayed by video display 118 may be in mechanical form. Accordingly, video display 118 may include any suitable electromechanical devices that move one or more mechanical objects, such as one or more mechanical rotatable wheels, reels, or dice. In the exemplary embodiment, information panel 120 is a back-lit, silk screened glass panel that includes lettering indicative of general game information including, for example, a number of coins wagered. Coin acceptor 110, bill acceptor 112, player-input buttons 108, video display 118, and information panel 120 are each used by a player to play a game on gaming machine 100. Each component 108, 110, 112, 118, and/or 120 is controlled by a gaming machine controller (not shown in FIG. 1) that is housed inside main cabinet 102. Numerous games including, but not limited to only including, video slot games, video poker, video pachinko, video black jack, video card games, and/or video keno may be implemented for play on gaming machine 100.

In the exemplary embodiment, gaming machine 100 also includes a top box 122 that is positioned on a top surface 124 of main cabinet 102. In the exemplary embodiment, top box 122 includes a number of devices that may be used to add features to a game being played on gaming machine 100. Such devices may include, but are not limited to only including, speakers 126, 128, and 130, a ticket printer 132 for printing bar-coded tickets 134, a key pad 136 for entering player tracking information, or player preferences or characteristics, a display 138 for displaying player tracking information and/or player preferences or characteristics, and a card reader 140 for receiving a card containing player tracking information and/or player preferences or characteristics encoded thereon. Card reader 140 may also be used to accept credit cards, printed cards, smart cards, and/or other magnetic stripe cards. Moreover, top box 122 includes a rotatable wheel 142 that may be used to add bonus features to a game being played on gaming machine 100. Wheel 142 includes a plurality of segments 144. In the exemplary embodiment, segments 144 are projected onto an inner surface (not shown in FIG. 1) of wheel 142 via one or more projectors (not shown in FIG. 1). During game play, such projectors may be controlled by circuitry, such as the gaming machine controller (not shown in FIG. 1) housed within main cabinet 102 and/or a wheel assembly controller (not shown in FIG. 1) housed within top box 122. In an alternative embodiment, segments 144 are generated using other display technologies such as, but not limited to, micro-electromechanical systems (MEMS) displays, optical paper, E Ink®, and/or electrophoretic displays (E Ink® is a registered trademark of E Ink Corporation, Cambridge, Mass., USA).

Figure 2:
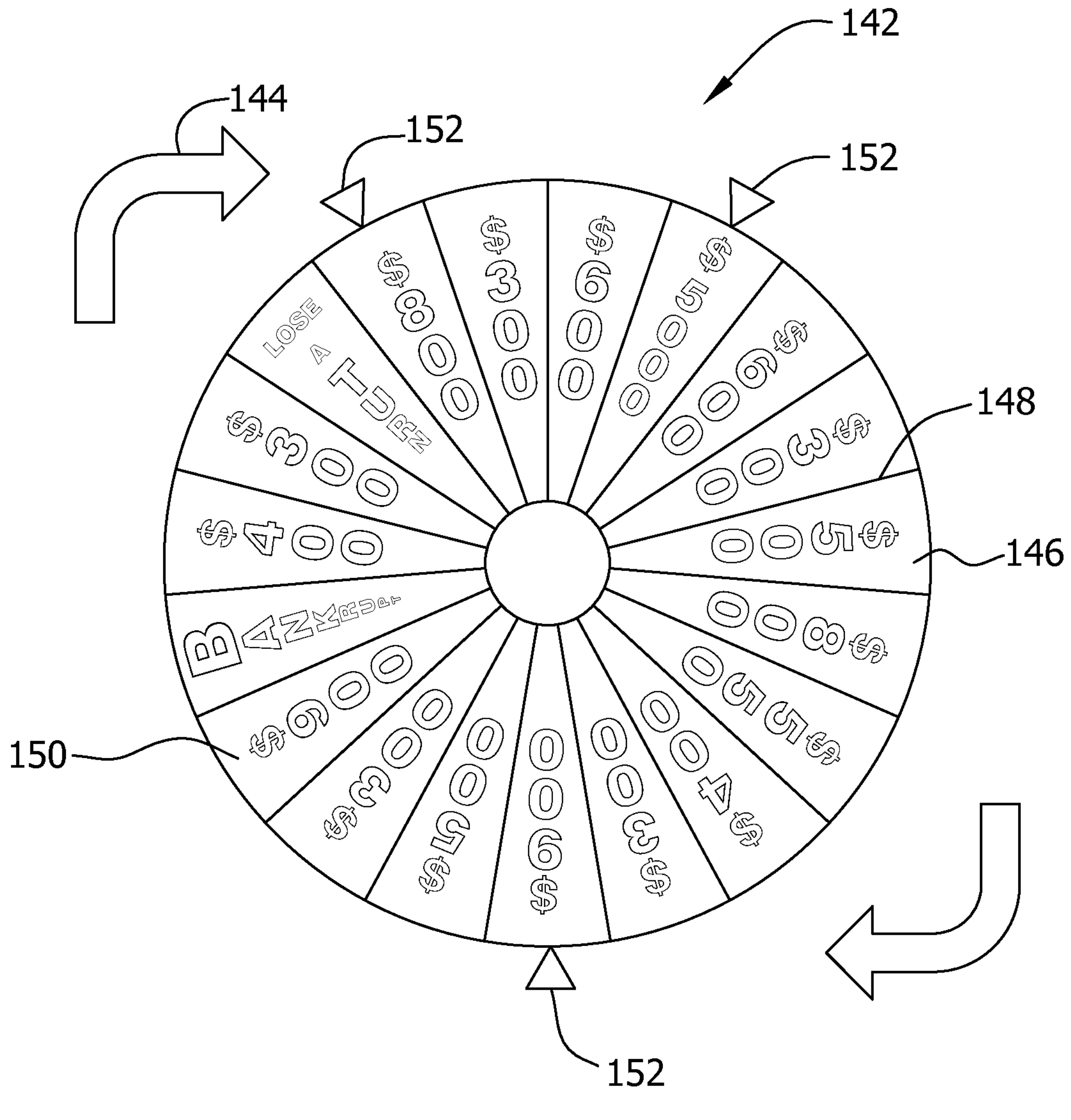
FIG. 2 is a diagram of an exemplary wheel that may be used with the gaming machine shown in FIG. 1.

FIG. 2 is a diagram of an exemplary wheel 142 that may be used with gaming machine 100 (shown in FIG. 1). In the exemplary embodiment, wheel 142 is rotatable in a clockwise direction as indicated by arrow 144. In an alternative embodiment, wheel 142 is rotatable in a counter-clockwise direction. In the exemplary embodiment, wheel 142 is a mechanical wheel that includes a plurality of segments 146 that are separated by a spoke 148. An award symbol 150 is associated with each segment 146, and one or more awards are associated with each award symbol 150. For example, such awards may be any suitable award including, but not limited to only including, credits, free wheel spins, free plays of the primary game, award multipliers, and/or any other award opportunities that may be made available. In addition to wheel 142, top box 122 (shown in FIG. 1) may also include one or more segment indicators 152. Each segment indicator 152 may be separately designated by, for example, colors, characters, numbers, images, and/or any other suitable designation. Each segment indicator 152 is positioned with respect to wheel 142 to indicate one of segments 146 after completion of a wheel spin.

Figure 3:
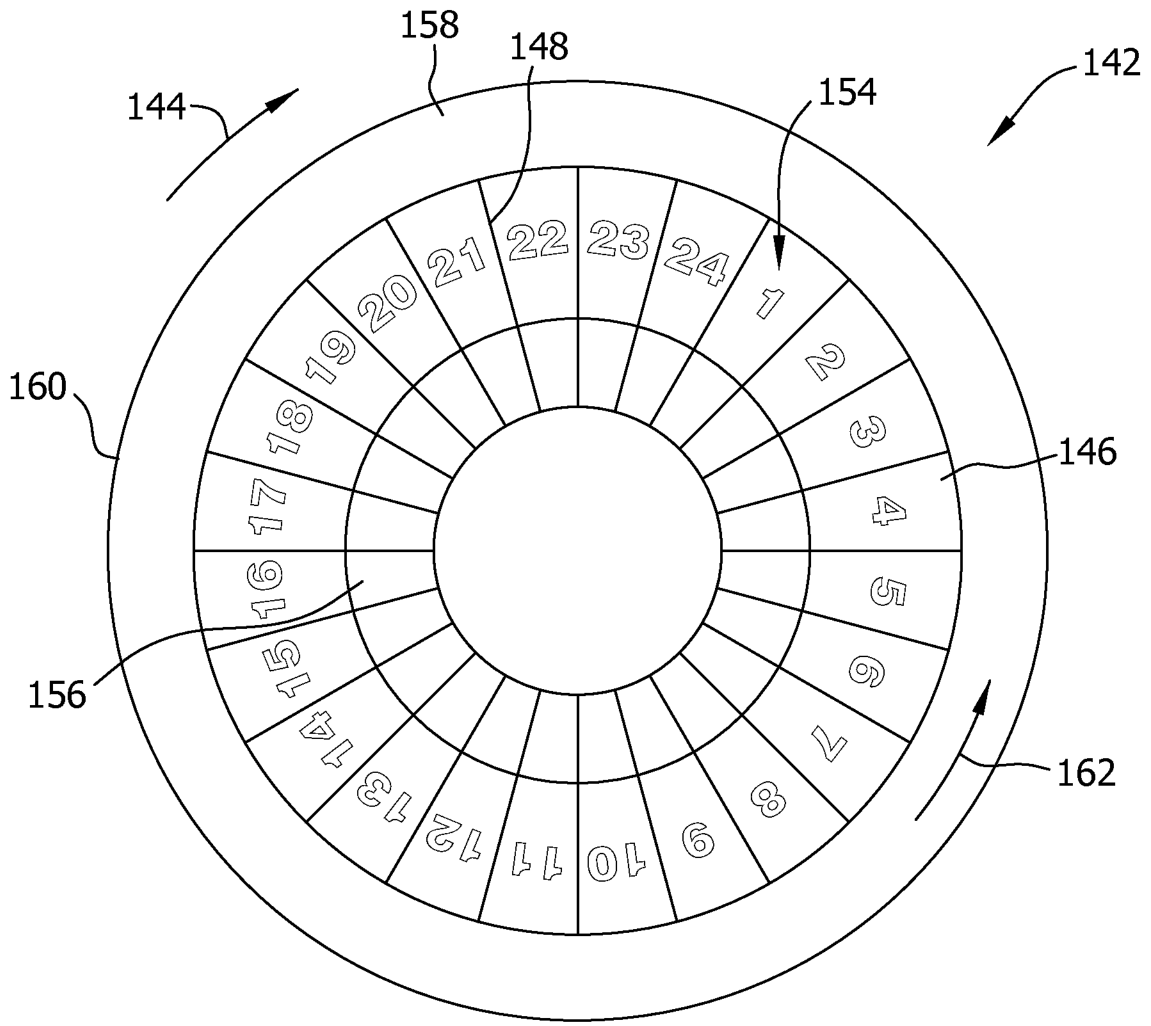
FIG. 3 is a diagram of an alternative embodiment of a wheel that may be used with the gaming machine shown in FIG. 1.

FIG. 3 is a diagram of an alternative embodiment of wheel 142 that may be used with gaming machine 100 (shown in FIG. 1). In the exemplary embodiment, and as illustrated in FIG. 3, wheel 142 is rotatable in a clockwise direction as indicated by arrow 144. In an alternative embodiment, wheel 142 is rotatable in a counter-clockwise direction. Moreover, in the exemplary embodiment, wheel 142 is a mechanical wheel that includes a plurality of segments 146 that are separated by a spoke 148. An identifier 154 and a pocket 156 are associated with each segment 146. Moreover, wheel 142 includes a track 158 that is positioned along an outer perimeter 160 of wheel 142. Track 158 is oriented such that, during use, a ball (not shown) that is released in a counter-clockwise direction 162 travels around track 158 until the ball loses momentum, and the ball then descends into a particular pocket 156 of a corresponding segment 146. The identifier 154 associated with the corresponding segment 146 indicates a winning number. A player having wagered on identifier 154 is awarded with any suitable award including, but not limited to only including, credits, free wheel spins, free plays of the primary game, award multipliers, and/or any other award opportunities that may be made available. During play, a random number generator, for example, may determine a winning number and one or more projectors (not shown) may be used to display identifiers 154.

Figure 4:
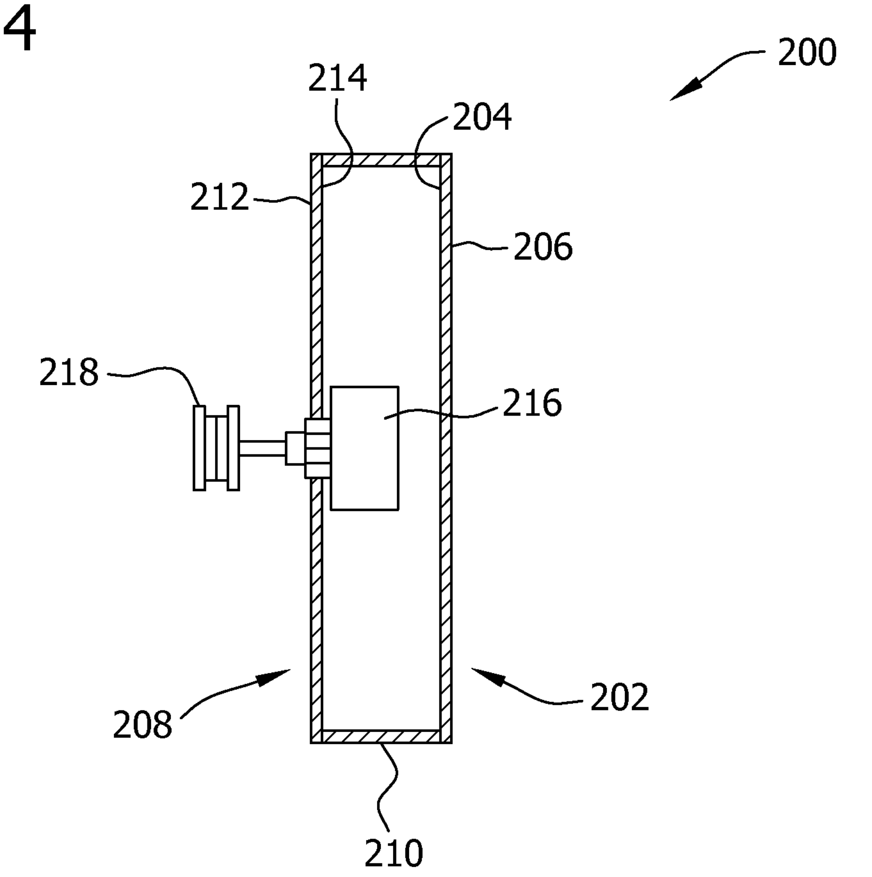
FIG. 4 is a cutaway side view of an exemplary wheel assembly that may be used with the gaming machine shown in FIG. 1.

FIG. 4 is a cutaway side view of an exemplary wheel assembly 200 that may be used with gaming machine 100 (shown in FIG. 1). In the exemplary embodiment, wheel assembly 200 includes a front portion 202 that includes an inner surface 204 and an outer surface 206. In the exemplary embodiment, outer surface 206 is embodied as wheel 142 (shown in FIGS. 2 and 3). Accordingly, in the exemplary embodiment, outer surface 206 includes segments 146 that are separated by spokes 148 and that are identified by award symbols 150 (each shown in FIG. 2). In an alternative embodiment, outer surface 206 includes segments 146 that are separated by spokes 148 and that are identified by identifiers 154 (each shown in FIG. 3). Moreover, in the alternative embodiment, outer surface 206 includes track 158 and pockets 156.

In the exemplary embodiment, wheel assembly 200 also includes a back portion 208 that is coupled to front portion 202 via an outer edge surface 210. Back portion 208 includes an outer surface 212 and an inner surface 214. Moreover, wheel assembly 200 includes a controller 216. In one embodiment, controller 216 is mounted to inner surface 214. In an alternative embodiment, controller 216 is positioned between front portion 202 and back portion 208 via a mounting mechanism. In the exemplary embodiment, wheel assembly 200 also includes a stepper motor 218 that rotates wheel assembly 200 about an axis (not shown).

Figure 5:
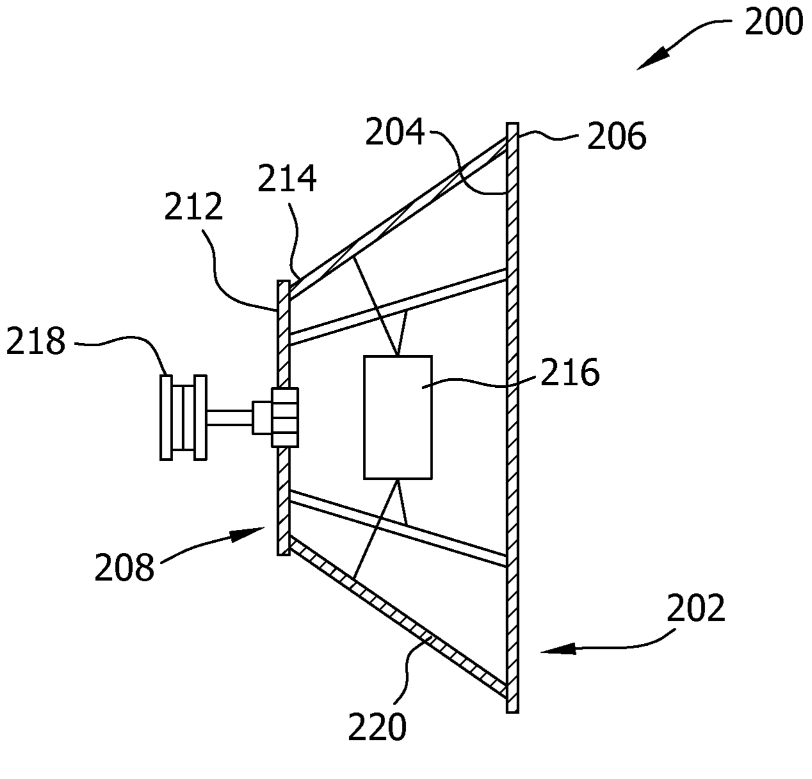
FIG. 5 is a cutaway side view of an alternative embodiment of a wheel assembly that may be used with the gaming machine shown in FIG. 1.

FIG. 5 is a cutaway side view of an alternative embodiment of wheel assembly 200. The embodiment of wheel assembly 200 illustrated in FIG. 5 is substantially similar to the embodiment of wheel assembly 200 illustrated in FIG. 4. However, as shown in FIG. 5, back portion 208 is coupled to front portion 202 via a plurality of rails 220 that are spaced about a circumference (not shown) of each back portion 208 and of each front portion 202. Moreover, as shown in FIG. 5, controller 216 is coupled to at least a portion of rails 220. Alternatively, controller 216 may be mounted to inner surface 214.

Figure 6:
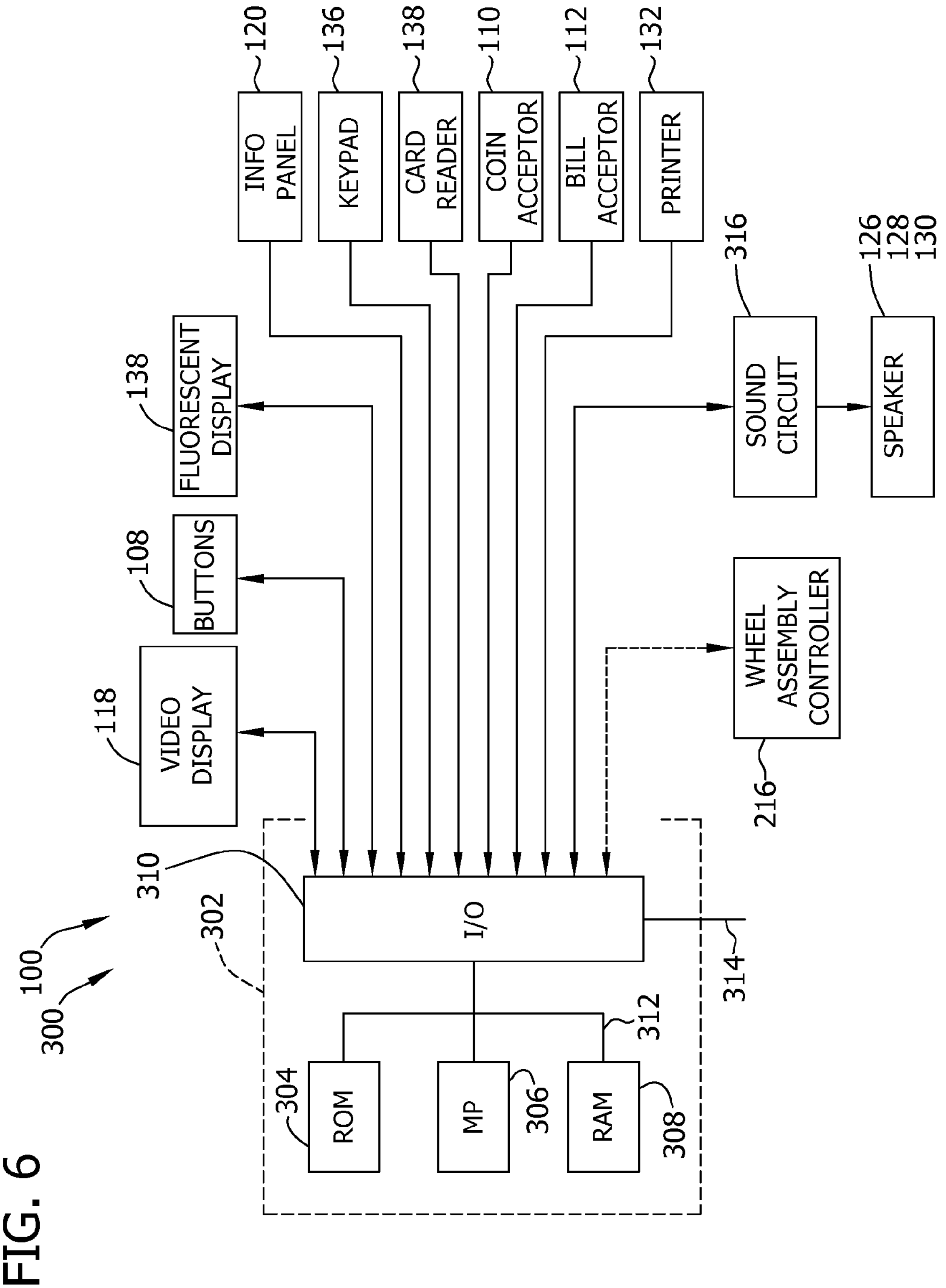
FIG. 6 is a block circuit diagram of an exemplary electrical architecture that may be used with the gaming machine shown in FIG. 1.

FIG. 6 is a block circuit diagram of an exemplary electrical architecture 300 that may be incorporated into a gaming machine, such as gaming machine 100 (shown in FIG. 1). In the exemplary embodiment, gaming machine 100 includes a gaming machine controller 302 that includes a read-only memory (ROM) 304, a microcontroller or microprocessor (MP) 306, a random-access memory (RAM) 308, and an input/output (I/O) circuit 310, that are each coupled via an address/data bus 312. As used herein, the terms "controller" and "processor" may include any programmable system including, but not limited to, systems using microcontrollers, reduced instruction set circuits (RISC), application specific integrated circuits (ASICs), logic circuits, and/or any other circuit or processor capable of executing the functions described herein. Such examples are exemplary only, and are thus not intended to limit in any way the definition and/or meaning of the terms "controller" or "processor". Alternative embodiments of controller 302 may include more than one microprocessor 306, multiple RAM modules 308, and/or multiple ROM modules 308. Moreover, although I/O circuit 310 is shown in FIG. 6 as a single component, one of ordinary skill in the art should appreciate that I/O circuit 310 may include any number or a plurality of different types of I/O circuits. Furthermore, RAM 308 and/or ROM 304 may be implemented as, for example, semiconductor memories, magnetically readable memories, and/or optically readable memories. In one embodiment, each operational component of gaming machine 100 is coupled to I/O circuit 310 via a respective conductor and/or via bus 312. Alternative embodiments may include only a single coupling between the operational components of gaming machine 100 and I/O circuit 310. In the exemplary embodiment, I/O circuit 310 is coupled to a gaming network (not shown) via a network interface 314. Moreover, in the exemplary embodiment, architecture 300 includes a sound circuit 316 that generates audio signals and that communicates audio signals between I/O circuit 310 and speakers 126, 128, and/or 130.

Moreover, in the exemplary embodiment, controller 302 is coupled to wheel assembly 200 (not shown in FIG. 6). More specifically, I/O circuit 310 is coupled to wheel assembly controller 216 to enable instructions to be communicated to wheel assembly controller 216 including, for example, instructions related to spin starts, spin stops, and/or an image to display across inner surface 204 as described in greater detail below.

Figure 7:
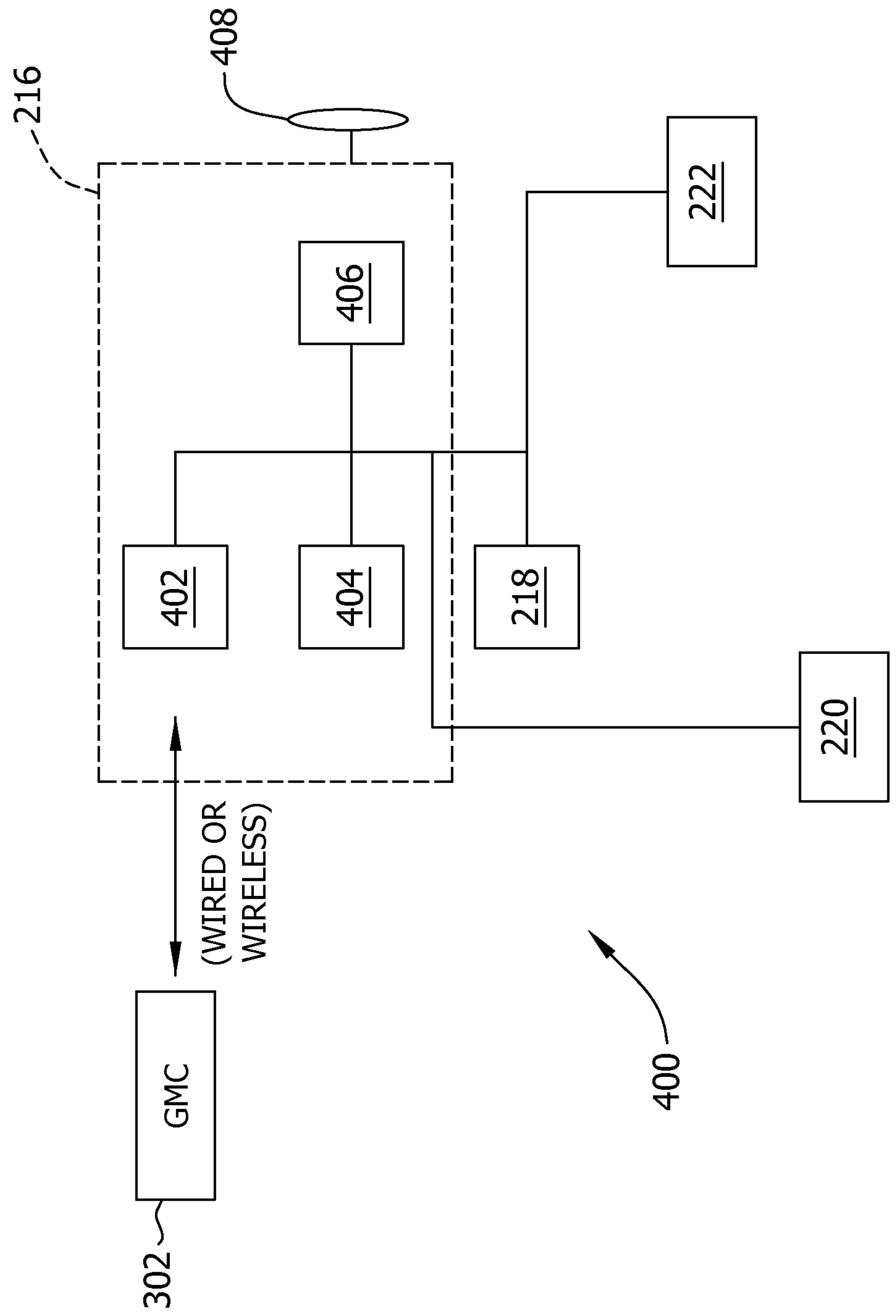
FIG. 7 is a schematic block diagram of an exemplary electrical architecture that may be used with the wheel assembly shown in FIGS. 5 and 6.

FIG. 7 is a schematic block diagram of an exemplary electrical architecture 400 of wheel assembly 200. In the exemplary embodiment, wheel assembly controller 216 includes a processor 402 and a memory 404 coupled to processor 402. Controller 216 also includes a presentation means, such as at least one projector 406. In the exemplary embodiment, projector 406 is one of a Liquid Crystal on Silicon (LCOS) projector, a laser projector, or a short-throw laser projector such as those commercially available from Light Blue Optics of Colorado Springs, Colo., USA. However, any suitable projector may be used that enables an image to be projected as described herein. Laser projectors or short-throw laser projectors facilitate maintaining focus of a projected image at varying focal lengths, such as when front portion 202 (shown in FIGS. 4 and 5) is beveled. In the exemplary embodiment, projector 406 projects an image, such as an image of wheel 142 (shown in FIGS. 2 and 3) across at least a portion of inner surface 204 (shown in FIGS. 2 and 3). More specifically, projector 406 is positioned, with respect to front portion 202 (shown in FIGS. 2 and 3), to enable an image of wheel 142 to be projected across at least a portion of inner surface 204. Moreover, in the exemplary embodiment, projector 406 rotates with wheel assembly 200 to maintain a substantially continuous projection of the image across inner surface 204.

Wheel assembly controller 216 receives the image to be projected by projector 406 from gaming machine controller 302. In the exemplary embodiment, gaming machine controller 302 transmits the image towards wheel assembly controller 216 via a wireless transmission protocol such as, but not limited to, Infrared Data Association (IrDA®), Zigbee®, or Bluetooth® (IrDA® is a registered trademark of Infrared Data Association Corporation, Walnut Creek, Calif., USA, ZigBee® is a registered trademark of ZigBee Alliance Corporation, San Ramon, Calif., USA, and Bluetooth® is a registered trademark of Bluetooth SIG, Inc., Bellevue, Wash., USA). More specifically, gaming machine controller 302 transmits the image to processor 402. In an alternative embodiment, gaming machine controller 302 transmits the image towards wheel assembly controller 216 via a wired connection, such as via a slip ring.

Moreover, in the exemplary embodiment, wheel assembly controller 216 performs an integrity check to ensure integrity of the projected image during sustained game operation. Specifically, processor 402 performs, such as periodically performs, an integrity check of processor 402, memory 404, projector 406, and communications between gaming machine controller 302 and wheel assembly controller 216. In the event that an error condition is detected, processor 402 presents an error condition, such as a "tilt" condition, to an operator. Exemplary error conditions may include, but are not limited to only including, a corrupted image, and/or a loss of communication between gaming machine controller 302 and wheel assembly controller 216.

In the exemplary embodiment, wheel assembly controller 216 controls rotation of wheel 142 using stepper motor 218. More specifically, wheel assembly controller 216 controls a direction and/or a speed of rotation of wheel 142 using stepper motor 218. Moreover, wheel assembly 200 includes a lens 408 that controls a projection angle by projector 406. In some embodiments, a position of lens 408 is controlled by processor 402 to focus display of the image and/or to control the projection angle.

In some embodiments, wheel assembly controller 216 is coupled to one or more touch sensors 220 that are positioned along at least a portion of outer surface 206 and that detect a touch input by a player or operator of gaming machine 100. Such a touch input may relate to a selection of a segment 146 by the player of gaming machine 100 during game play or a selection by the operator during a configuration.

Moreover, in some embodiments, wheel assembly controller 216 and/or gaming machine controller 202 is coupled to a gesture recognition device 222 that detects a gesture by a player or operator of gaming machine 100 as a player input. For example, gesture recognition device 222 may initiate rotation of wheel assembly 200 based on a gesture. Gesture recognition device 222 may be provided as a pad, such as a touch pad, along a portion of a button panel (not shown) of gaming machine cabinet 102. Alternatively, gesture recognition device 222 may be a motion sensor (not shown) that is positioned with respect to a player to enable gesture recognition device 222 to detect a hand signal or gesture performed by a player at a predetermined distance from gesture recognition device 222. Gesture recognition device 222 may also be provided using a holographic interaction device. As another alternative, gesture recognition device 222 may include one or more cameras (not shown) that detect a gesture and convert the gesture into a command.

Figure 8:
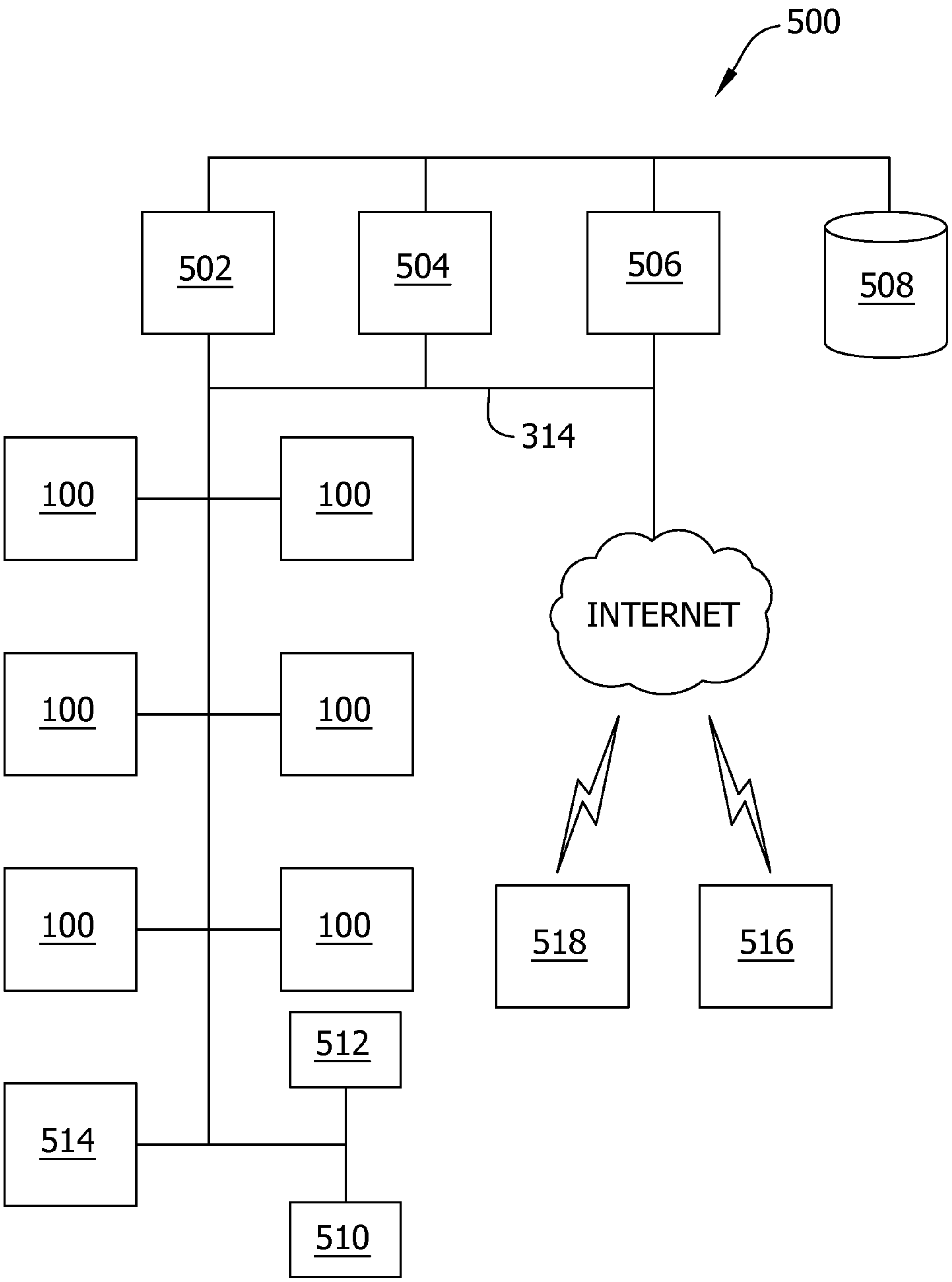
FIG. 8 is a block schematic diagram of an exemplary gaming system.

FIG. 8 is a block schematic diagram of an exemplary gaming system 500 that includes a plurality of gaming machines 100. Each gaming machine 100 is coupled via a network connection 314 to one or more servers, such as a game server 502, an accounting server 504, and a player tracking server 506. Each server 502, 504, and 506 includes a processor (not shown) that facilitates data communication between each gaming machine 100 and other components of gaming system 500. Such data is stored in, for example, a database 508 coupled to each server 502, 504, and 506. Moreover, each server 502, 504, and 506 also includes audio capabilities, such as a CD-ROM drive (not shown) or DVD-ROM drive (not shown), that are coupled to a sound card (not shown) for processing and transmitting digitized sound effects to one or more speakers 510 in response to commands issued over gaming system 500 by a corresponding server 502, 504, and/or 506. Each server 502, 504, and 506 is also coupled via gaming system 500 to an electronic sign or screen 512 that displays information, such as via scrolling and/or flashing messages that indicate, for example, progressive and/or jackpot amounts, and that are visible to players playing gaming machines 100. Messages for display on each electronic screen 512 are generated and/or modified in response to commands issued over gaming system 500 by servers 502, 504, and/or 506.

As described above, gaming machines 100 may include video poker machines, video slot machines, and/or other similar gaming machines that implement alternative games. Moreover, gaming machines 100 may be terminal-based machines, wherein the actual games, including random number generation and/or outcome determination, are performed at a server, such as servers 502, 504, and/or 506. In such an embodiment, gaming machine 100 displays results of the game via primary display device 118 (shown in FIG. 1).

Moreover, in the exemplary embodiment, gaming system 500 includes a configuration workstation 514 that includes a user interface that enables an administrator to set up and/or to modify portions of gaming system 500 and/or servers 502, 504, and 506. Player tracking server 506 tracks data of players using gaming machines 100, and also controls messages that appear on each display device 118 and 142 and/or information panel 120 of gaming machines 100. In the exemplary embodiment, player tracking server 506 also stores physical characteristics of players, such as, but not limited to, the player age and/or vision data. Game server 502 controls bonus applications or bonus systems that award bonus opportunities on gaming system 500. Moreover, game server 502 includes a set of rules for awarding jackpots in excess of those established by winning pay tables (not shown) of each gaming machine 100. Some bonus awards may be awarded randomly, while other bonus awards may be made to groups of gaming machines 100 operating in a progressive jackpot mode. Player tracking server 506 may store data related to the players and tracked using player tracking identification, such as a player card. Moreover, player tracking server 506 may store information and data about the player such as loyalty points, player address, phone number, and/or any information that may be retrieved and transmitted to the game server 502. Accounting server 504 may store and track information such as, but not limited to, the average amount of wager played by the player, and/or any funds the player may have in an account.

Furthermore, in the exemplary embodiment, gaming system 500 includes one or more remote computers 516 and/or mobile devices 518 that access system 500 via an external network, such as the Internet.

Figure 9:
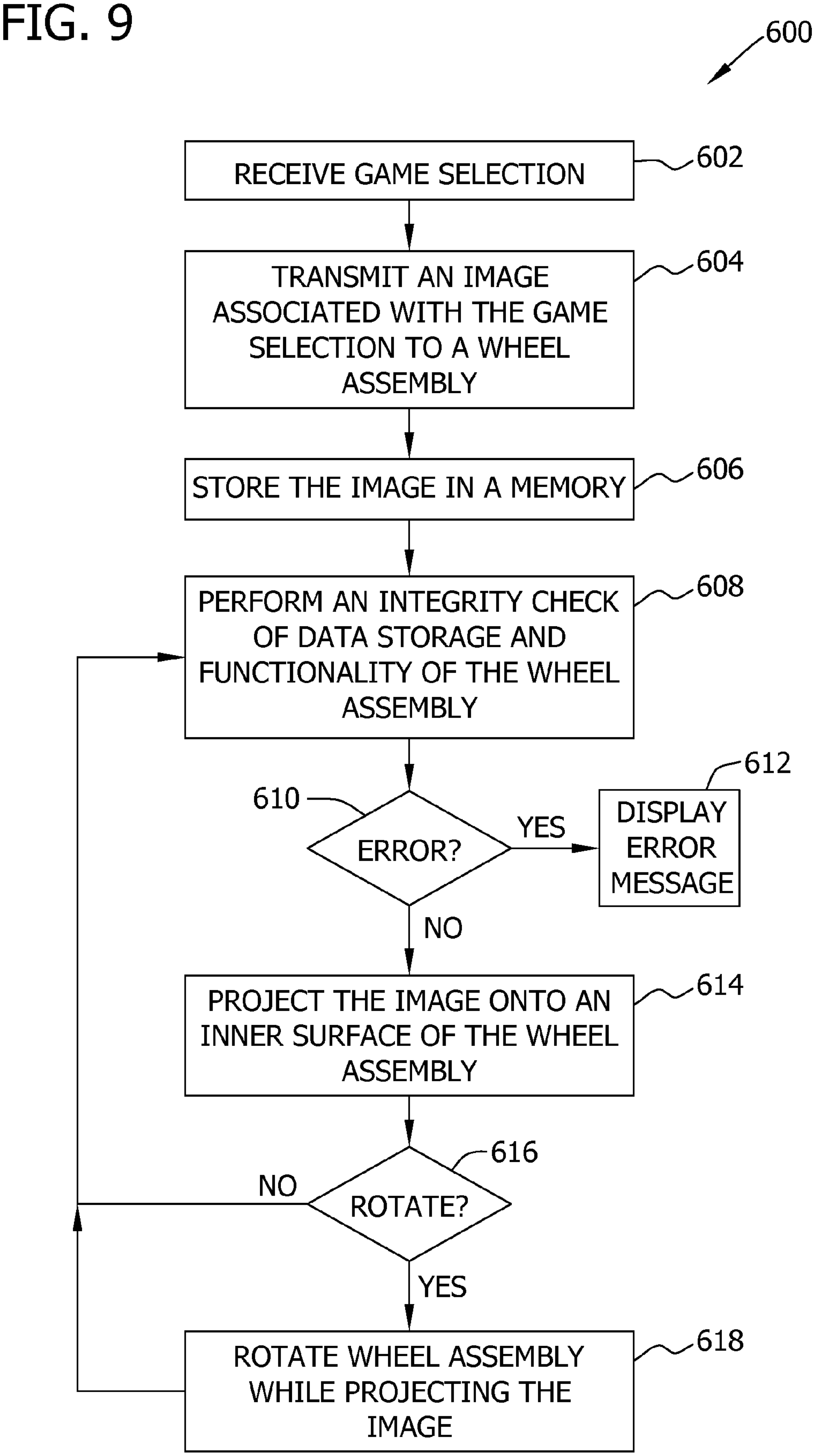
FIG. 9 is a flowchart illustrating an exemplary gaming method.

FIG. 9 is a flowchart 600 illustrating an exemplary gaming method. In the exemplary embodiment, gaming machine 100 (shown in FIG. 1) receives 602 a game selection. Moreover, in the exemplary embodiment, the game selection is associated with game graphics that include at least one image for display via wheel assembly 200 (shown in FIGS. 1-5). In some embodiments, gaming machine 100 receives a game selection input from a player via video display 118 (shown in FIG. 1). In an alternative embodiment, the game selection is received by a server, such as game server 502 (shown in FIG. 8), via an input by an operator. In such an embodiment, game server 502 transmits the game selection and the associated game graphics to gaming machine 100 via network 314 (shown in FIG. 8).

Moreover, in the exemplary embodiment, gaming machine controller 302 (shown in FIGS. 6 and 7) transmits 604 the image to wheel assembly 200. In the exemplary embodiment, gaming machine controller 302 transmits the image to wheel assembly controller 216 (shown in FIGS. 6 and 7) via a wireless communication protocol. In an alternative embodiment, gaming machine controller 302 transmits the image to wheel assembly controller 216 via a wired connection, such as via a slip ring. In the exemplary embodiment, wheel assembly controller 216 stores 606 the image in memory 404 (shown in FIG. 7).

In the exemplary embodiment, processor 402 (shown in FIG. 7) performs 608 an integrity check to ensure data integrity and/or functional integrity is maintained during operation of gaming machine 100. For example, processor 402 performs an integrity check, such as a cyclic redundancy check (CRC) function to ensure data integrity of the image stored in memory 404. Processor 402 also performs functionality checks of processor 402, memory 404, projector 406 (shown in FIG. 7), and/or the communication between gaming machine controller 302 and wheel assembly controller 216. In the exemplary embodiment, after detecting 610 an error, processor 402 transmits an error message to gaming machine controller 302. Gaming machine controller 302 displays 612 an error, such as a "tilt" message, and/or alerts an operator of the error. In some embodiments, video display 118 and/or wheel assembly 200 display an error message.

If no error is detected 610, processor 402 causes projector 406 to project 614 the image across at least a portion of inner surface 204 (shown in FIGS. 4 and 5). In one embodiment, a plurality of spokes 148 define a plurality of wheel segments 146 (both shown in FIGS. 2 and 3). In such an embodiment, projector 406 projects a corresponding image segment across each wheel segment 146. In an alternative embodiment, wheel assembly 200 includes a plurality of projectors 406. In such an embodiment, each projector 406 projects an image across a corresponding portion of inner surface 204.

In the exemplary embodiment, gaming machine controller 302 determines 616 whether to initiate rotation of wheel assembly 200. In response to a positive determination, gaming machine controller 302 initiates 618 rotation of wheel assembly 200 about an axis of rotation. Specifically, gaming machine controller 302 determines when to initiate rotation based on, for example and not by way of limitation, a game outcome. Gaming machine controller 302 may also initiate rotation as part of an attraction sequence or a celebration sequence. In the exemplary embodiment, gaming machine controller 302 communicates an initiation command to wheel assembly controller 216 via, for example, a wireless communication link. Processor 402 causes stepper motor 218 (shown in FIGS. 4 and 5) to initiate rotation of wheel assembly 200 in accordance with the initiation command. Notably, projector 406 is coupled, such as fixedly secured, within wheel assembly 200 such that projector 406 rotates about the same axis of rotation as wheel assembly 200. Moreover, projector 406 continues to project 614 the image across inner surface 204 during rotation. Gaming machine controller 302 may initiate rotation of wheel assembly 200 based on any trigger including, for example, player input. Player input may be detected via touch sensors (not shown) positioned across, for example, at least a portion of video display 118 and/or across at least a portion of outer surface 206. For example, in one embodiment, a player may be prompted to choose a segment 146 of wheel 142. The player selection is detected via touch sensor 220 (shown in FIG. 7), and rotation of wheel assembly 200 is initiated upon detection of the player selection. In an alternative embodiment, rotation of wheel assembly 200 is initiated upon detection of a player gesture using gesture recognition device 222 (shown in FIG. 7). In another alternative embodiment, rotation of wheel assembly 200 is initiated upon actuation of a button 108 (shown in FIG. 1).

Figure 10:
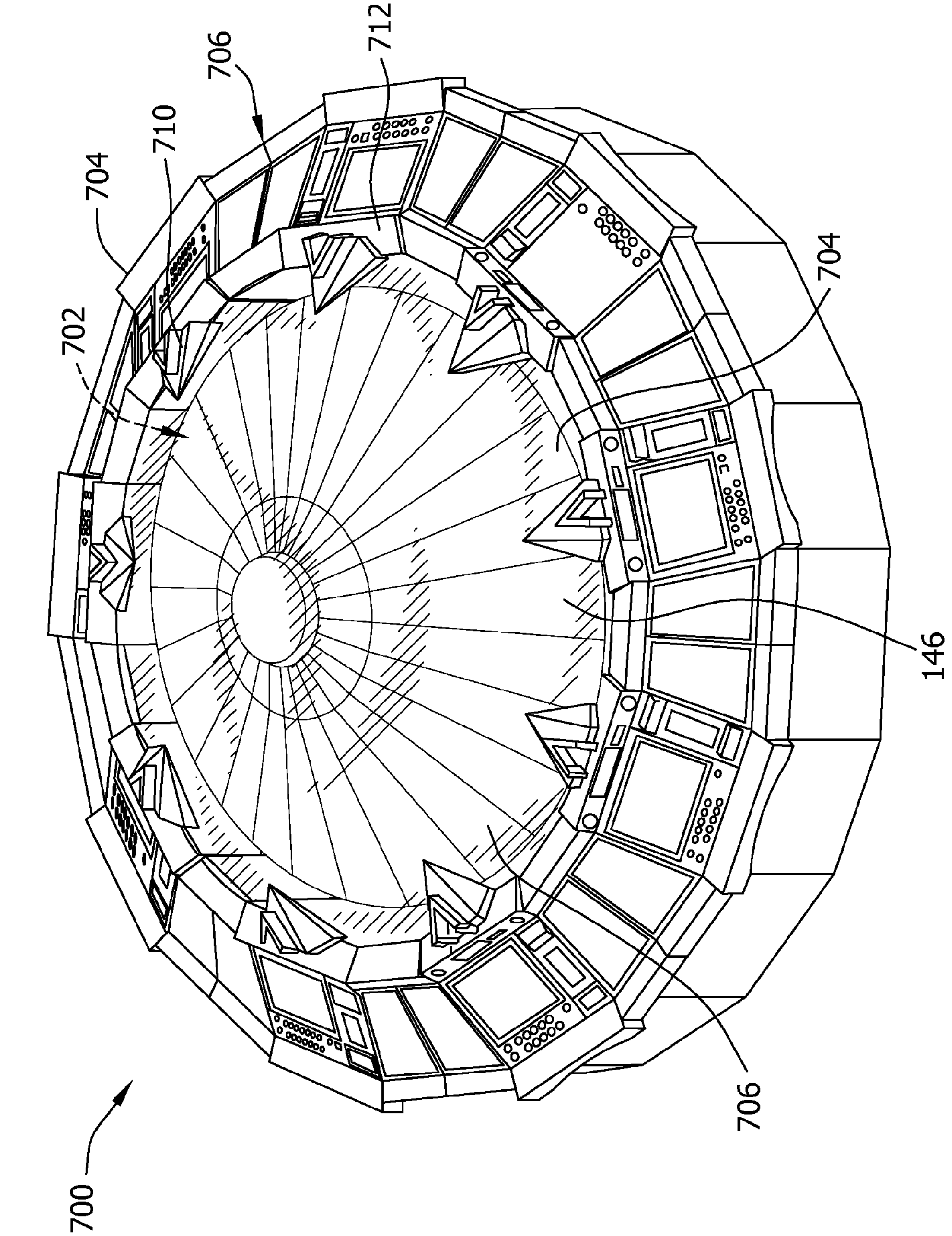
FIG. 10 is a schematic diagram of an exemplary gaming system that includes a shared wheel assembly.

FIG. 10 is a schematic diagram of an exemplary gaming system 700 that includes a shared wheel assembly 702. In the exemplary embodiment, wheel assembly 702 is embodied substantially similar to wheel assembly 200 (shown in FIGS. 4 and 5). Specifically, wheel assembly 702 includes a front portion 704 having an inner surface, such as inner surface 204 (shown in FIGS. 4 and 5) an outer surface 706. Moreover, wheel assembly 702 includes a presentation means, such as projector 406 (shown in FIG. 7) that projects an image of, for example, wheel 142 (shown in FIGS. 2 and 3), across inner surface 204. More specifically, projector 406 rotates in conjunction with wheel assembly 702 and projects the image across inner surface 204. In some embodiments, a plurality of projectors 406 each project a separate image across a corresponding portion of inner surface 204.

In the exemplary embodiment, gaming system 700 includes a plurality of individual gaming machines 704 that are spaced about wheel assembly 702 via respective spacer assemblies 706. Outer surface 706 is viewable by players of each gaming machine 704. In the exemplary embodiment, wheel assembly 702 is rotatable in a clockwise direction as indicated by arrow 708. In an alternative embodiment, wheel assembly 702 is rotatable in a counterclockwise direction.

In addition, in the exemplary embodiment, any player of gaming machines 704 may win an award designated by wheel assembly 702. Specifically, while two or more players may share in the same bonus event, each player participating in the bonus event is provided with an individual outcome or award. Moreover, even if a player playing a gaming machine 704 is not participating in a particular bonus event, wheel assembly 702 generates an outcome associated with the non-participating gaming machine 704. Accordingly, each time wheel assembly 702 is activated, an individual outcome is generated for each gaming machine 704.

In one exemplary embodiment, projector 406 projects an image across inner surface 204 that includes a plurality of segments, such as segments 146. Moreover, each gaming machine 704 includes an indicator 710 that is positioned along a top surface 712 of each gaming machine 704. Each indicator 710 points to or indicates an award or outcome of wheel assembly 702. More specifically, each indicator 710 points to or indicates a respective segment 146 when wheel assembly 702 completes a spin in order to reveal a bonus event outcome. Each indicator 710 may be illuminated differently at different times or different states of gaming machine 704 via an internal lighting device (not shown). The illumination of each indicator 710 may be based on, for example, whether the associated gaming machine 704 is playing a primary game, is in a state in which the player has committed to play the bonus event using wheel assembly 702, and/or whether the player has purchased an entry into a progressive bonus event using wheel assembly 702.

Figure 11:
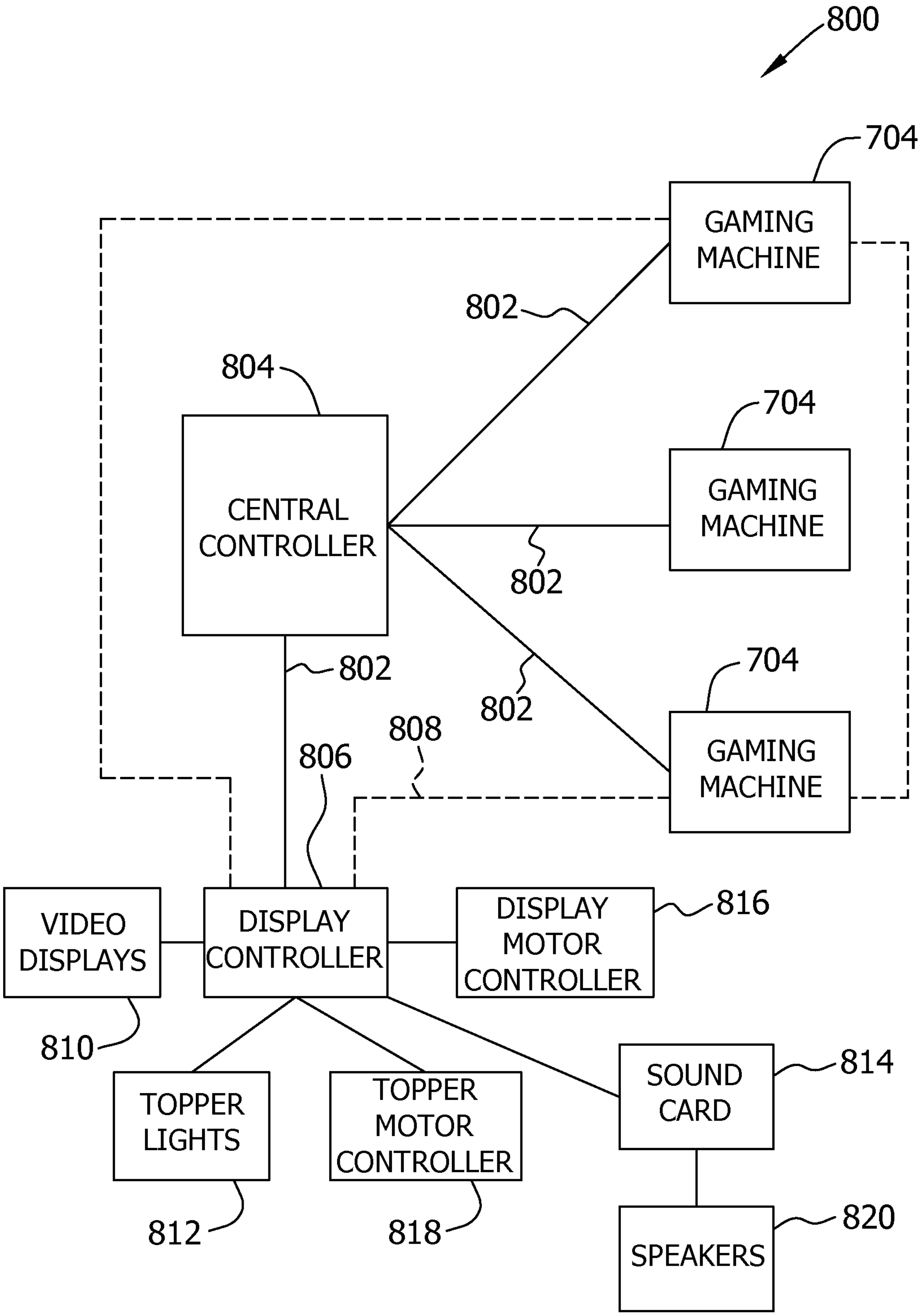
FIG. 11 is a block diagram of an exemplary wide area gaming system that may include the gaming system shown in FIG. 10.

FIG. 11 is a block diagram of an exemplary wide area gaming system 800 that may include gaming system 700 (shown in FIG. 10). In the exemplary embodiment, additional gaming machines 704 may be connected to centrally located gaming system 700 using a remote communication link 802 such that, some or all of the functions of each gaming machine 704 are provided by a central controller 804. More specifically, a processor (not shown) of each gaming machine 704 may be programmed to facilitate transmission of signals representative of game play and/or bonus game play between gaming machine 704 and central controller 804. Each gaming machine 704 and central controller 804 may be arranged on a local area network (LAN), in which one or more gaming machines 704 are proximate to each other and on the same site as central controller 804. Alternatively, each gaming machine 704 and central controller 804 may be arranged on a wide area network (WAN), in which one or more gaming machines 704 are located at a different site than other gaming machines 704 and/or central controller 804. Communication link 802 may be an intranet or the Internet. In the exemplary embodiment, gaming system 800 operates substantially similar to gaming network 500 (shown in FIG. 8).

In some embodiments, a game outcome provided to a player at a particular gaming machine 704 is determined by central controller 804, and is then provided to the player. In response to a player initiating game play, gaming machine 704 requests a game outcome from central controller 804. Central controller 804 randomly generates the game outcome and then transmits the game outcome to gaming machine 704 via communication link 802. The generated game outcome may include a primary game outcome, a secondary game outcome, and/or a shared display bonus outcome.

In some embodiments, central controller 804 maintains one or more pools of predetermined game outcomes. In response to a game outcome request received from gaming machine 704, central controller 804 selects a predetermined game outcome from the pool of predetermined game outcomes. Central controller 804 marks the selected game outcome as used such that, once the selected game outcome is marked as used, it is prevented from being selected again until a predetermined time or triggering event has occurred. The predetermined game outcome may include a primary game outcome, a secondary game outcome, and/or a shared display bonus outcome.

In some embodiments, each gaming machine 704 independently generates a game outcome, and transmits the game outcome to central controller 804 via communications link 802. Central controller 804 monitors the activities and events occurring on each gaming machine 704, including monitoring accounting and player tracking using a player database for storing player profiles, a player tracking module for tracking players, and/or a credit system for providing automated casino transactions.

In some embodiments, gaming machines 704 are coupled to central controller 804 in a progressive configuration. A portion of each wager made in initiating a primary game is allocated to bonus or secondary event awards. Central controller 804 monitors the allocation process and determines when the allocated portions reach a predetermined threshold that enables the progressive jackpot.

In the exemplary embodiment, gaming system 800 also includes a display controller 806 that is coupled to central controller 804 via communication link 802. In some embodiments, display controller 806 is also coupled to gaming machines 704 via an additional communication link 808. In the exemplary embodiment, display controller 806 is also coupled to one or more video displays 810, one or more topper lights 812, a sound card 814, a display motor controller 816, and a topper motor controller 818. Video display 810 displays images or sequences of images such as, but limited to, attraction sequences, bonus initiation sequences, and the like. Display motor controller 816 is coupled to wheel assembly 702 (shown in FIG. 10), and controls the speed and/or direction of rotation of wheel assembly 702. Display controller 806 communicates with sound card 814 in order to generate sound signals for output by one or more speakers 820. The sound signals may be output in conjunction with the images or sequences of images displayed by video display 810 and/or with rotation of wheel assembly 702.

Exemplary embodiments of methods, systems, and apparatus for use in presenting a changeable image via a rotating wheel display are described above in detail. The methods, systems, and apparatus are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

Although the present invention is described in connection with an exemplary gaming system environment, embodiments of the invention are operational with numerous other general purpose or special purpose gaming system environments or configurations. The gaming system environment is not intended to suggest any limitation as to the scope of use or functionality of any aspect of the invention. Moreover, the gaming system environment should not be interpreted as having any dependency or requirement relating to any one or combination of components illustrated in the exemplary operating environment. Examples of well known gaming systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, the term "processor" refers generally to any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, the term "database" refers generally to any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A gaming machine comprising:

a gaming machine controller configured to control game play on said gaming machine;

a main display; and a wheel assembly rotatably coupled to said gaming machine, said wheel assembly comprising:

a front portion divided into a plurality of segments configured to present indicia to a player of the gaming machine, wherein the plurality of segments form a planar structure, wherein the planar structure has an inner surface and an outer surface, wherein the indicia are visible to the player on the outer surface, wherein the planar structure is configured to rotate about an axis of rotation, and wherein the axis of rotation passes through the planar structure; and at least one projector configured to:

rotate with said wheel assembly about the axis of rotation; and project an image across at least a portion of said inner surface during game play such that the image is visible from a perspective of a player of the gaming machine, the front portion and the inner surface corresponding to at least a portion of a circular major surface of the wheel assembly.

2. A gaming machine in accordance with claim 1, wherein said wheel assembly further comprises a rear portion extending from said front portion via an outer edge, wherein the rear portion is parallel to the front portion, and wherein said at least one projector is coupled to said rear portion.

3. A gaming machine in accordance with claim 1, wherein said wheel assembly further comprises a rear portion coupled to said front portion via a plurality of connectors, said at least one projector coupled to at least some of said plurality of connectors.

4. A gaming machine in accordance with claim 1, wherein said wheel assembly further comprises a lens configured to focus projection of the image.

5. A gaming machine in accordance with claim 1, wherein said wheel assembly further comprises a memory configured to store the image.

6. A gaming machine in accordance with claim 5, wherein said wheel assembly further comprises a processor coupled to said memory and to said at least one projector, said processor further configured to: receive the image from said gaming machine controller; and cause said at least one projector to display the image.

7. A gaming machine in accordance with claim 6, wherein said processor is configured to receive the image from said gaming machine controller via wireless communication.

8. A gaming machine in accordance with claim 6, wherein said processor is configured to perform an integrity check of said at least one projector and said memory.

9. A gaming machine in accordance with claim 8, wherein said gaming machine controller is configured to detect an error condition during the integrity check.

10. A gaming machine in accordance with claim 1, wherein the outer surface includes a plurality of spokes positioned between the plurality of segments.

11. A gaming machine in accordance with claim 10, wherein the image includes a plurality of image segments that each corresponds with one of the plurality of segments, and wherein the plurality of image segments correspond to the indicia presented to the player.

12. A gaming machine in accordance with claim 11, wherein said at least one projector comprises a plurality of projectors that are each configured to project a respective image across a corresponding portion of said inner surface.

13. A gaming machine in accordance with claim 10, wherein said front portion further comprises at least one touch sensor configured to detect a touch input on said outer surface.

14. A gaming machine in accordance with claim 1, further comprising a gesture recognition device coupled to said gaming machine controller, said gesture recognition device configured to recognize at least one player gesture as a player input, said gaming machine controller further configured to initiate rotation of said wheel assembly based on detection of the at least one gesture.

15. A wheel assembly for use with a gaming machine, said wheel assembly comprising:

a stepper motor configured to rotate said wheel assembly;

a front portion divided into a plurality of segments configured to present indicia to a player, wherein the plurality of segments form a planar structure, wherein the planar structure has an inner surface and an outer surface, wherein the indicia are visible to the player on the outer surface, and wherein the planar structure is configured to rotate about an axis of rotation; and a presentation means configured to visibly present an image across at least a portion of said front portion and to rotate with said wheel assembly about the axis of rotation.

16. A wheel assembly in accordance with claim 15, further comprising a lens configured to focus projection of the image.

17. A wheel assembly in accordance with claim 15, further comprising a memory configured to store the image.

18. A wheel assembly in accordance with claim 17, further comprising a processor coupled to said stepper motor, to said memory, and to said presentation means, said processor configured to receive the image and cause said presentation means to display the image.

19. A wheel assembly in accordance with claim 15, wherein the outer surface includes a plurality of spokes positioned between the plurality of segments.

20. A wheel assembly in accordance with claim 19, wherein the image includes a plurality of image segments that each corresponds with one of the plurality of segments, and wherein the plurality of image segments correspond to the indicia presented to the player.

21. A wheel assembly in accordance with claim 20, wherein said presentation means comprises a plurality of projectors that are each configured to project a respective image across a corresponding portion of an inner surface of said front portion.

22. A wheel assembly in accordance with claim 19, wherein said front portion further comprises at least one sensor configured to detect an input from a player representative of an action command.

23. A gaming method comprising:

receiving a game selection at a gaming machine, the game selection associated with at least one image;

transmitting, from a gaming machine controller of the gaming machine, the at least one image to a wheel assembly within the gaming machine, the wheel assembly including a front portion divided into a plurality of segments configured to present indicia to a player of the gaming machine, wherein the plurality of segments form a planar structure, wherein the planar structure has an inner surface and an outer surface, wherein the planar structure is configured to rotate about an axis of rotation such that the axis of rotation passes through the planar structure, and the wheel assembly further including at least one projector;

projecting the at least one image, by the at least one projector, across at least a portion of the inner surface; and rotating the wheel assembly, including the at least one projector and the planar structure, during display of the at least one image.

24. A gaming method in accordance with claim 23, wherein receiving a game selection comprises receiving a game selection input from the player via the gaming machine.

25. A gaming method in accordance with claim 23, wherein receiving a game selection comprises:

receiving a game selection input from an operator via a server coupled to the gaming machine via a network; and receiving the game selection input, by the gaming machine from the server, via the network.

26. A gaming method in accordance with claim 25, further comprising receiving, by a gaming machine controller, game graphics from the server, the game graphics including the at least one image.

27. A gaming method in accordance with claim 23, wherein the wheel assembly includes a memory and a processor coupled to the memory and to the at least one projector, said gaming method further comprising performing an integrity check of the memory and the at least one projector using the processor.

28. A gaming method in accordance with claim 27, further comprising: detecting an error condition during the integrity check; and generating an error message in response to the detection.

29. A gaming method in accordance with claim 23, wherein the front portion includes an outer surface having a plurality of spokes positioned to define a plurality of corresponding display segments, and wherein the at least one image includes a plurality of image segments, said projecting the at least one image across at least a portion of the inner surface comprises projecting each of the plurality of image segments onto a corresponding one of the plurality of display segments.

30. A gaming method in accordance with claim 29, wherein the at least one projector includes a plurality of projectors, said projecting each of the plurality of image segments onto a corresponding one of the plurality of display segments comprises projecting each of the plurality of image segments using a corresponding projector.

31. A gaming method in accordance with claim 23, wherein the front portion includes at least one touch sensor, said gaming method further comprising receiving a touch input from a player via the at least one touch sensor.

32. A gaming method in accordance with claim 23, wherein the gaming machine includes a gesture recognition device, said gaming method further comprising: detecting at least one player gesture as a player input; and initiating rotation of the wheel assembly based on recognition of the at least one gesture.

33. A gaming system comprising:

a plurality of gaming machines;

a wheel assembly configured to rotate about an axis of rotation, said wheel assembly comprising: a front portion divided into a plurality of segments configured to present indicia to players of the plurality of gaming machines, wherein the front portion comprises an inner surface and an outer surface, the front portion being disk-shaped, wherein the plurality of gaming machines are positioned about a circumference of the wheel assembly; and at least one projector configured to rotate with said wheel assembly and to project an image across at least a portion of said inner surface; and a controller coupled to said plurality of gaming machines and to said wheel assembly, said controller configured to initiate rotation of said wheel assembly about the axis of rotation.

34. A gaming system in accordance with claim 33, wherein said wheel assembly further comprises a memory configured to store the image, and a processor coupled to said memory and said at least one projector, said processor configured to: receive the image from said controller; and cause said at least one projector to display the image.

35. A gaming system in accordance with claim 33, wherein the outer surface includes a plurality of spokes positioned between the plurality of segments, and wherein the image includes a plurality of image segments that each corresponds with one of the plurality of segments.

36. A gaming machine in accordance with claim 35, wherein said at least one projector comprises a plurality of projectors, each projector configured to project a respective image across a corresponding portion of said inner surface.

37. A gaming method comprising:

accepting a wager made by a player using at least one of a plurality of gaming machines;

enabling play of a game at the plurality of gaming machines, wherein the game is associated with at least one image;

transmitting the at least one image to at least a portion of a disk-shaped portion of a wheel assembly, wherein the plurality of gaming machines are positioned about a circumference of the wheel assembly;

presenting the at least one image across at least a portion of a surface of the wheel assembly by at least one projector of the wheel assembly; and rotating the wheel assembly, including the disk-shaped portion and the at least one projector, during display of the at least one image.

38. A gaming method in accordance with claim 37, wherein the front portion includes an outer surface having a plurality of spokes positioned to define a plurality of corresponding display segments, and wherein the at least one image includes a plurality of image segments, said presenting the at least one image across at least a portion of a surface of the wheel assembly comprises projecting each of the plurality of image segments onto a corresponding one of the plurality of display segments using the at least one projector.

39. A gaming method in accordance with claim 38, wherein the at least one projector includes a plurality of projectors, said projecting each of the plurality of image segments onto a corresponding one of the plurality of display segments comprises projecting each of the plurality of image segments using a corresponding projector.

* * * * *